(12) United States Patent
Albert et al.

(10) Patent No.: US 10,222,785 B2
(45) Date of Patent: Mar. 5, 2019

(54) METHOD FOR MANUFACTURING A COMPONENT OF A FIELD DEVICE

(71) Applicant: Endress+Hauser GmbH+Co. KG, Maulburg (DE)

(72) Inventors: Joachim Albert, Leonberg (DE); Detlev Wittmer, Maulbronn (DE); Marc Baret, Kembs (FR); Dietmar Spanke, Steinen (DE); Thomas Uehlin, Schopfheim (DE)

(73) Assignee: Endress-Hauser SE+Co. KG, Maulburg (DE)

( * ) Notice: Subject to any disclaimer, the term of this patent is extended or adjusted under 35 U.S.C. 154(b) by 66 days.

(21) Appl. No.: 15/514,127

(22) PCT Filed: Aug. 19, 2015

(86) PCT No.: PCT/EP2015/069072
§ 371 (c)(1),
(2) Date: Mar. 24, 2017

(87) PCT Pub. No.: WO2016/045882
PCT Pub. Date: Mar. 31, 2016

(65) Prior Publication Data
US 2017/0308062 A1 Oct. 26, 2017

(30) Foreign Application Priority Data
Sep. 26, 2014 (DE) .................. 10 2014 113 997

(51) Int. Cl.
*G05B 19/4099* (2006.01)
*B33Y 50/02* (2015.01)
(Continued)

(52) U.S. Cl.
CPC .......... *G05B 19/4099* (2013.01); *B33Y 10/00* (2014.12); *B33Y 50/02* (2014.12);
(Continued)

(58) Field of Classification Search
None
See application file for complete search history.

(56) References Cited

U.S. PATENT DOCUMENTS

| 2004/0073404 A1* | 4/2004 | Brooks ............... G05B 19/409 |
| | | 702/183 |
| 2013/0015596 A1* | 1/2013 | Mozeika ............... B25J 9/0084 |
| | | 264/40.1 |

(Continued)

FOREIGN PATENT DOCUMENTS

| CN | 104062461 A | 9/2014 |
| DE | 102007020131 A1 | 10/2008 |

(Continued)

OTHER PUBLICATIONS

Search Report for German Patent Application No. 10 2014 113 997.6, German Patent Office, dated Jun. 18, 2015, 5 pp.

(Continued)

*Primary Examiner* — Ramesh B Patel
(74) *Attorney, Agent, or Firm* — Mark A. Logan; PatServe

(57) ABSTRACT

The present disclosure relates to a method for manufacturing a component of a field device for determining or monitoring a process variable of a medium in a container, wherein the component is created via a 3D printing method, wherein during the creation the component is supplied at an intermediate state of the component with an exciter signal, wherein a response signal of the component to the exciter signal is registered, wherein shape and/or structure of the component are/is modified via the 3D printing method, when the current response signal does not agree with a predetermined response signal, and wherein the two previous method steps are alternately repeated, until the current (Continued)

response signal agrees with the predetermined response signal within predetermined tolerance limits.

16 Claims, 1 Drawing Sheet

(51) Int. Cl.
*B33Y 10/00* (2015.01)
*B22F 3/105* (2006.01)

(52) U.S. Cl.
CPC ..... *B22F 3/1055* (2013.01); *B22F 2003/1057* (2013.01); *G05B 2219/49023* (2013.01)

(56) References Cited

U.S. PATENT DOCUMENTS

| | | | | |
|---|---|---|---|---|
| 2013/0170171 A1* | 7/2013 | Wicker | ............... | H01L 21/4846 361/809 |
| 2014/0268604 A1* | 9/2014 | Wicker | ................ | B29C 70/885 361/760 |
| 2015/0165690 A1* | 6/2015 | Tow | ........................ | B33Y 80/00 700/119 |
| 2015/0287247 A1* | 10/2015 | Willis | ..................... | G06T 19/20 345/419 |
| 2017/0239884 A1* | 8/2017 | Batchelder | .......... | B29C 67/0055 |

FOREIGN PATENT DOCUMENTS

| | | |
|---|---|---|
| DE | 102007056984 A1 | 5/2009 |
| EP | 2537642 A1 | 12/2012 |
| WO | 2014068269 A1 | 5/2014 |

OTHER PUBLICATIONS

International Search Report for Patent Application No. PCT/EP2015/069072, WIPO, dated Dec. 21, 2015, 13 pp.

Campbell, Tibbits, Garrett, The Next Wave: 4D Printing Programming the Material World, Atlantic Council, May 2014, 18 pp.

Leigh, Bradley, Purssell, Billson, Hutchins, A Simple, Low-Cost Conductive Composite Material for 3D Printing of Electronic Sensors, PLOS One, vol. 7, Issue 11, Nov. 2012, 6 pp.

* cited by examiner

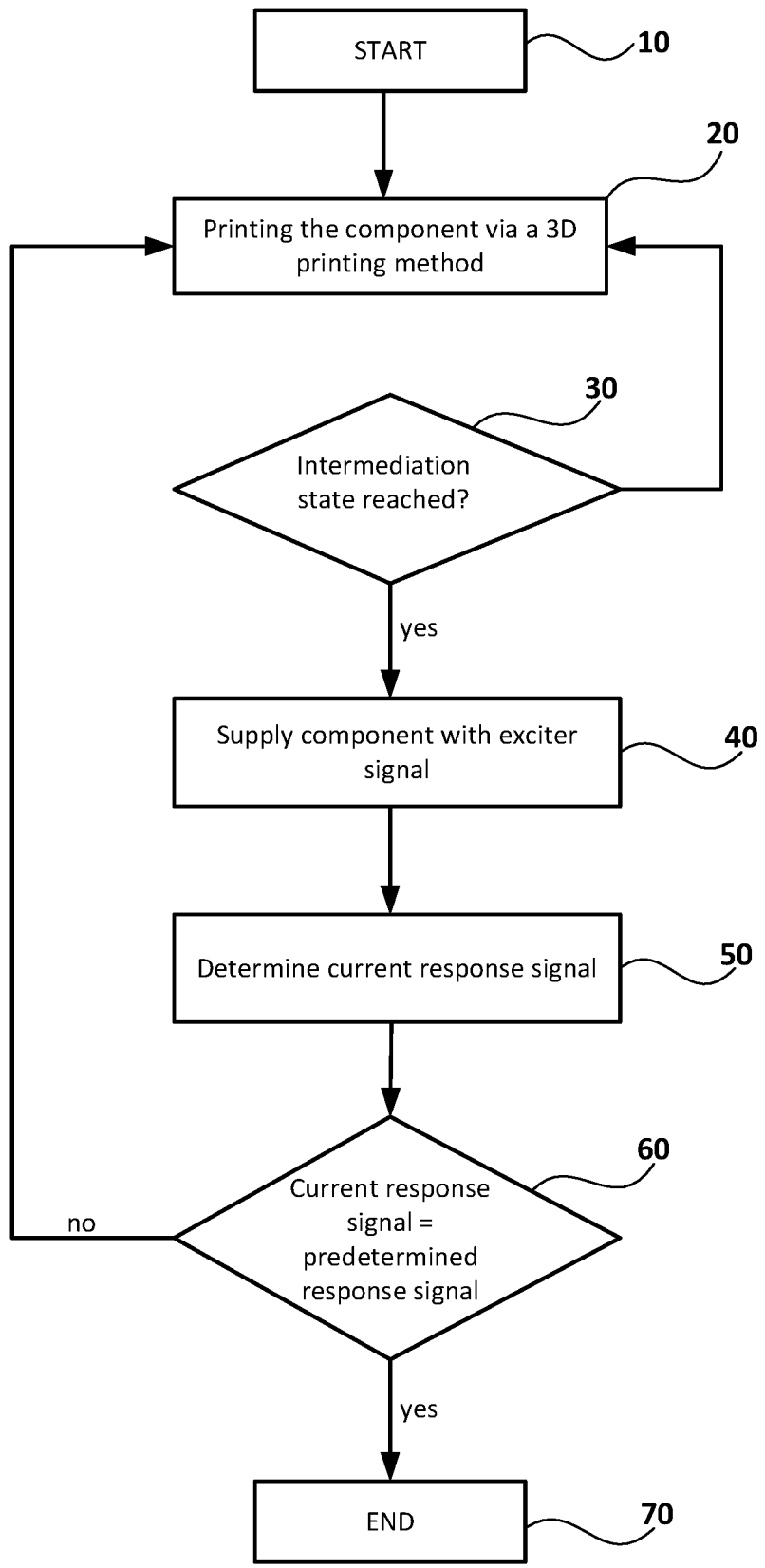

METHOD FOR MANUFACTURING A COMPONENT OF A FIELD DEVICE

CROSS-REFERENCE TO RELATED APPLICATIONS

The present application is related to and claims the priority benefit of PCT Patent Application No. PCT/EP2015/069072, filed Aug. 19, 2015 and German Patent Application No. 10 2014 113 997.6, filed on Sep. 26, 2014, the entire contents of which are incorporated herein by reference.

TECHNICAL FIELD

The present disclosure relates to a method for manufacturing a component of a field device for determining or monitoring a process variable of a medium in a container and to a component manufactured according to the method of the present disclosure. The component is a sensor element or a subcomponent of a sensor element.

BACKGROUND

Serving for registering process variables in automation technology are sensors, which have at least one sensor element and which are installed, for example, in fill level measuring devices, flow measuring devices, pressure and temperature measuring devices, analytical measuring devices, etc. The devices register the corresponding process variables, fill level, flow, pressure, temperature, and analytical data, such as pH-value, turbidity or conductivity. Serving for influencing process variables are actuators, such as, for example, valves or pumps, via which the flow of a liquid in a section of pipeline or the fill level in a container can be changed. Sensors and actuators are generally referred to as field devices. Referred to as field devices in connection with the present disclosure are, however, all devices that are applied near to the process and which deliver, or process, process relevant information. Field devices are usually composed of a plurality of components, whose structure and construction are as simple as possible, in order to keep the manufacturing effort using conventional manufacturing methods as small as possible.

A sensor element of a field device of automation technology includes usually at least one sensitive component, via which an electrical signal is converted into a process variable of the medium to be determined or monitored or a process variable of the medium to be determined or monitored is converted into an electrical signal. The sensitive components fulfill respectively defined functions. In addition to the sensitive components, purely mechanical components can be present. Consider, for example, a vibronic sensor for limit level, density, and/or viscosity determination. In the case of a vibronic sensor, a single rod or an oscillatory fork oscillates at a predetermined resonant frequency. In the case of an electrical resistance element, for example, a length of platinum wire, applied for temperature measurement, it should have a defined resistance value at a predetermined temperature.

Usually, the adjusting of the oscillatory fork to the resonant frequency or the tuning of a resistor to a defined resistance value occurs via a trimming-process. During trimming, sufficient material is removed, or added, that the oscillatory fork oscillates with the predetermined resonant frequency, or the resistor has at a certain temperature a predetermined resistance value.

The trimming is a relatively complex process. Depending on sensor element, or depending on component of the sensor element, too strong trimming can destroy the item. Also, removal of material negatively influences the long term stability of the component or the sensor element.

An object of the present disclosure is to provide a method for targeted manufacturing of a sensor element or for targeted manufacturing of a component of a sensor element.

BRIEF SUMMARY

The object is achieved by a method for manufacturing a component of a field device for determining or monitoring a process variable of a medium in a container, comprising method steps as follows: creating the component via a 3D printing method; during the creating, supplying the component at an intermediate state of the component with an exciter signal; registering a response signal of the component to the exciter signal; modifying shape and/or structure of the component via the 3D printing method, when a current response signal does not agree with a predetermined response signal; alternately repeating the two previous method steps, until the current response signal agrees with the predetermined response signal within predetermined tolerance limits. Via the method of the present disclosure, the component can be highly precisely manufactured. The terminology, 3D printing method, is intended to include all generative manufacturing processes.

The optimized manufacturing process of the present disclosure with an in situ monitoring of the process variable, or with an in situ monitoring of a parameter of the process variable, means that a subsequent working of the component can be avoided. The previous disadvantages, which occur in the case of conventional trimming of the component of the sensor element, or of the sensor element, are eliminated. Also, an option is provided to manufacture the component, or the sensor element, customer and/or application specifically. Thus especially, the material of the oscillatory fork of a vibronic sensor and the resonant frequency can be established job specifically as a function of the medium to be measured.

In an advantageous embodiment of the method of the present disclosure, the exciter signal is applied to ascertain a physical parameter or a characteristic variable of the physical parameter of the sensor element or component. For example, the component is the oscillatory fork of a vibration detector. Analogously, the vibration detector can also be embodied as a single rod oscillator or as a membrane oscillator. Vibration detectors are sold by the applicant in various embodiments for different applications.

If the vibration detector is applied as a limit level switch, then the physical parameter is the fill level of a medium in a container. The vibration detector is excited with a periodic signal, usually a sinusoidal signal, and based on change of the resonant frequency and/or the amplitude of the response signal, information can be gained as to whether the tines of the oscillatory fork of the vibration detector are freely oscillating or in contact with the medium.

Likewise an option is to determine or to monitor the density or the viscosity of a medium with a vibration detector.

In other cases, the component is supplied with a pulse-shaped signal as exciter signal for the purpose of determining or monitoring the physical parameter. Based on the decay behavior of the response signal, information can be gained as to whether the component is already so embodied that the current response signal agrees, at least approximately, with a predetermined response signal. A characteristic variable of the physical parameter is, in this case, for example, the relaxation time.

In an advantageous embodiment, the predetermined response signal is established customer and/or application specifically.

Moreover, an embodiment of the method of the present disclosure provides that for the 3D printing of the component at least one metal or at least one synthetic material, e.g. plastic, is applied and that a selective laser melting, especially a selective laser sintering, is used as 3D printing method. If at least one synthetic material is applied as material, then the 3D printing method for the at least one synthetic material can be fused deposition modeling or multi jet modeling. If the material is at least one ceramic, then the 3D printing method for the ceramic can be color jet printing (CJP). Of course, a component can be made of different materials, which are processed together in a 3D printing process. Also, an option is to provide the material with a suitable porosity via a 3D printing process. A corresponding method is described in PCT patent application number PCT/EP2015/072254, which is published as WO 00002016046417 A1, the entire contents of which is expressly incorporated by reference. The referenced patent application also names examples of embodiments for the field of automation technology.

Preferably, the component is the oscillatable unit of a vibronic, level sensor. Of course, the vibronic sensor can also be used for determining density or viscosity. Preferably, the physical parameter is the resonant frequency of the oscillatable unit. The characteristic variable of the physical parameter is in the case of a vibronic sensor especially the amplitude and/or the frequency of the response signal and/or the phase shift between the exciter signal and the response signal.

Furthermore, the component can be an electrical resistor. The exciter signal is an electrical current led through the resistor; the response signal is the voltage measured across the resistor. Via the manufacturing process of the present disclosure, also in this case, a subsequent trimming of the resistor can be omitted, since the process variable, or at least one process parameter, is monitored during the 3D printing.

BRIEF DESCRIPTION OF THE DRAWINGS

The present disclosure will now be explained in greater detail based on the appended drawing, the sole FIGURE of which shows as follows:

FIG. 1 shows a flow diagram of a preferred embodiment of the method of the present disclosure for manufacturing a component of a field device for determining or monitoring a process variable of a medium in a container.

DETAILED DESCRIPTION

After the start of the method at point 10, the component is created at point 20 via a 3D printing method. The basic structure and shape are predetermined. Moreover, the material from which the component is manufactured is predetermined. During the creation of the component, at least one defined intermediate state is specified (point 30). As soon as this intermediate state is reached, the component is supplied with an exciter signal (point 40). At point 50, the response signal of the component to the exciter signal is registered.

If the current response signal does not correspond to a predetermined response signal, such being checked at point 60, then the points 20, 30, 40, 50 are repeated successively, until agreement within predetermined tolerances is present. In given cases, also a method step can be added, in the case of which material is removed from the component with targeting. At point 70, the method for manufacture of the component is terminated.

What is claimed is:

1. A method for manufacturing a component of a field device for determining or monitoring a process variable of a medium in a container, comprising:
   defining an intermediate creation state of a component of a field device;
   at least partially creating the component via a 3D printing method until the intermediate creation state is reached;
   exciting the component at the intermediate creation state with an exciter signal;
   registering a response signal of the component to the exciter signal;
   modifying a shape and/or a structure of the component via the 3D printing method when the response signal does not agree with a predetermined response signal within a predetermined tolerance; and
   alternately repeating the registering and the modifying until the response signal agrees with the predetermined response signal within the predetermined tolerance.

2. The method as claimed in claim 1, wherein the exciter signal is applied to ascertain a physical parameter or a characteristic variable of the physical parameter of the component.

3. The method as claimed in claim 1, wherein the predetermined response signal is established customer and/or application specifically.

4. The method as claimed in claim 1, wherein for the 3D printing of the component at least one metal or at least one synthetic material is applied, and a selective laser melting is used as the 3D printing method.

5. The method as claimed in claim 1, wherein for the 3D printing of the component at least one metal or at least one synthetic material is applied, and a selective laser sintering is used as the 3D printing method.

6. The method as claimed in claim 1, wherein at least one synthetic material is applied for the component, and fused deposition modeling or multi jet modeling is used as the 3D printing method for the at least one synthetic material.

7. The method of claim 1, wherein the component is an oscillatable unit of a vibronic sensor, wherein exciting the component includes applying a periodic vibrating signal to the oscillatable unit, and wherein registering the response signal includes registering a resonant frequency or an amplitude of the response signal.

8. The method of claim 7, wherein the oscillatable unit is an oscillatory fork.

9. The method of claim 7, wherein the oscillatable unit is a single rod oscillator.

10. The method of claim 7, wherein the oscillatable unit is a membrane oscillator.

11. The method of claim 1, wherein the component is an oscillatable unit of a vibronic sensor, wherein exciting the component includes applying a pulse signal to the oscillatable unit, and wherein registering the response signal includes registering the decay behavior of the response signal.

12. The method of claim 1, wherein the component is an electrical resistor, wherein exciting the component includes passing an electrical current through the resistor, and wherein registering the response signal includes measuring a voltage across the resistor.

13. A component manufactured via a method comprising:
defining an intermediate creation state of a component of a field device;
at least partially creating the component via a 3D printing method until the intermediate creation state is reached;
exciting the component at the intermediate creation state with an exciter signal;
registering a response signal of the component to the exciter signal;
modifying a shape and/or a structure of the component via the 3D printing method when the response signal does not agree with a predetermined response signal within a predetermined tolerance; and
alternately repeating the registering and the modifying until the response signal agrees with the predetermined response signal within the predetermined tolerance,
wherein the component is an oscillatable unit of a vibronic level sensor.

14. The component as claimed in claim 13, wherein the exciter signal is applied to ascertain a resonant frequency of the oscillatable unit.

15. The component as claimed in claim 13, wherein the exciter signal is applied to ascertain a characteristic variable of a physical parameter of the component, and the characteristic variable is an amplitude or a frequency of the response signal or a phase shift between the exciter signal and the response signal.

16. A component manufactured via a method comprising:
defining an intermediate creation state of a component of a field device;
at least partially creating the component via a 3D printing method until the intermediate creation state is reached;
exciting the component at the intermediate creation state with an exciter signal;
registering a response signal of the component to the exciter signal;
modifying a shape and/or a structure of the component via the 3D printing method when the response signal does not agree with a predetermined response signal within a predetermined tolerance; and
alternately repeating the registering and the modifying until the response signal agrees with the predetermined response signal within the predetermined tolerance,
wherein the component is an electrical resistor.

* * * * *